(12) United States Patent
Yokoyama et al.

(10) Patent No.: US 8,827,457 B2
(45) Date of Patent: Sep. 9, 2014

(54) PROJECTOR

(75) Inventors: Eiji Yokoyama, Matsumoto (JP);
Shinichi Wakabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 13/009,437

(22) Filed: Jan. 19, 2011

(65) Prior Publication Data

US 2011/0181838 A1    Jul. 28, 2011

(30) Foreign Application Priority Data

Jan. 22, 2010    (JP) ................. 2010-011765

(51) Int. Cl.
| | |
|---|---|
| G03B 21/00 | (2006.01) |
| G03B 21/14 | (2006.01) |
| G02F 1/00 | (2006.01) |
| G02F 1/1335 | (2006.01) |
| G03B 33/12 | (2006.01) |
| H04N 9/31 | (2006.01) |
| G02B 27/10 | (2006.01) |
| G02B 27/14 | (2006.01) |
| G02B 27/28 | (2006.01) |

(52) U.S. Cl.
CPC .............. *G02B 27/149* (2013.01); *G03B 21/14* (2013.01); *G03B 33/12* (2013.01); *H04N 9/3105* (2013.01); *G02B 27/1026* (2013.01); *G02B 27/145* (2013.01); *G02B 27/283* (2013.01); *H04N 9/315* (2013.01); *H04N 9/3197* (2013.01)
USPC ................. 353/31; 353/20; 349/8; 348/751

(58) Field of Classification Search
USPC ........ 353/30, 31, 20, 33, 34, 81, 82; 349/5, 7, 349/8, 9, 10; 348/744, 751, 790, 791
See application file for complete search history.

(56) References Cited

U.S. PATENT DOCUMENTS

| | | | |
|---|---|---|---|
| 6,327,093 B1 | 12/2001 | Nakanishi et al. | |
| 7,101,047 B2 * | 9/2006 | Florence et al. | ................ 353/20 |
| 7,137,704 B2 | 11/2006 | Okuyama et al. | |
| 8,061,844 B2 | 11/2011 | Nagumo | |
| 2005/0007555 A1 * | 1/2005 | Manabe et al. | ................ 353/20 |
| 2009/0021699 A1 | 1/2009 | Hsu et al. | |
| 2009/0141243 A1 | 6/2009 | Suzuki | |

FOREIGN PATENT DOCUMENTS

| | | |
|---|---|---|
| CN | 1532583 A | 9/2004 |
| CN | 101349818 A | 1/2009 |
| CN | 101614945 A | 12/2009 |
| JP | A-2000-75427 | 3/2000 |
| JP | A-2001-75174 | 3/2001 |
| JP | A-2009-36819 | 2/2009 |
| JP | A-2009-229647 | 10/2009 |

\* cited by examiner

*Primary Examiner* — William C Dowling
*Assistant Examiner* — Ryan Howard
(74) *Attorney, Agent, or Firm* — Oliff PLC

(57) ABSTRACT

A projector includes: a plurality of reflection-type light modulation device which modulate a plurality of color light fluxes according to image information; a plurality of reflection-type polarizing plate; a color combining device; a projection lens that projects the combined color light from the color combining device; and a light-transmissive member that transmits a color light flux incident thereon, wherein the light-transmissive member is disposed only in an optical path between a first reflection-type polarizing plate, which is one of the plurality of reflection-type polarizing plate, and the color combining device.

5 Claims, 4 Drawing Sheets

PROJECTOR

BACKGROUND

1. Technical Field

The present invention relates to a projector.

2. Related Art

There has been what is called a three-panel projector using three reflective liquid crystal panels, each of which is, for example, formed of LCOS (Liquid Crystal On Silicon), provided for respective three colors, R (red), G (green), and B (blue) as light modulators that modulate incident light fluxes in accordance with image information (see JP-A-2009-036819, for example).

The projector described in JP-A-2009-036819 includes a wire grid for each of the color light fluxes, and the wire grid separates the color light flux with which the corresponding reflective liquid crystal panel is illuminated and the color light flux modulated by the liquid crystal panel from each other based on polarization. The color light fluxes modulated by the reflective liquid crystal panels and separated by the wire grids based on polarization are combined in a color combining device, and the combined light is projected on a screen through a projection lens.

When optical parts are disposed in a densely packed arrangement so that the size of a projector is reduced, the optical path of a specific light flux among the three color light fluxes cannot be separated from an optical part disposed in the optical path of another color light flux by a sufficiently large distance. To keep the distance described above sufficiently large while maintaining the size of the projector to be small, it is, for example, conceivable to extend the distance between the wire grid disposed in the optical path of the specific color light flux and the color combining device, that is, extend only the optical path length of the specific color light flux.

All the reflective liquid crystal panels, however, need to be disposed in the back focal position of the projection lens so that sharp image light fluxes are projected through the projection lens. Simply extending the optical path length of the specific color light flux between the reflective liquid crystal panel that modulates the specific color light flux and the projection lens inevitably requires the optical path lengths of the other color light fluxes to be extended, disadvantageously resulting in no reduction in size of the optical apparatus.

SUMMARY

An advantage of some aspects of the invention is to provide a projector that allows its size to be reduced.

A projector according to an aspect of the invention includes a plurality of reflection-type light modulation device which modulate a plurality of color light fluxes in according to image information, a plurality of reflection-type polarizing plate provided in correspondence with the plurality of reflection-type light modulation device and separating the color light fluxes with which illuminated to the reflection-type light modulation device and modulated by the reflection-type light modulation device according to polarization, a color combining device having a plurality of light incident surfaces on which the color light fluxes having been modulated by the plurality of reflection-type light modulation device and passed through the plurality of reflection-type polarizing plate are incident, and combining the each of incident color light fluxes, a projection lens that projects the combined color light from the color combining device, and a light-transmissive member that transmits a color light flux incident thereon. The light-transmissive member is disposed only in an optical path between a first reflection-type polarizing plate, which is one of the plurality of reflection-type polarizing plate, and the color combining device.

In the projector according to the aspect of the invention, the light-transmissive member is disposed only in the optical path between the first reflection-type polarizing plate and the color combining device.

The light-transmissive member disposed in the optical path between any of the reflection-type polarizing plate and the color combining device makes the optical path length of the color light flux passing through the light-transmissive member longer than in a case where no light-transmissive member is disposed. Specifically, the difference in optical path between a color light flux traveling through the light-transmissive member and the color light flux traveling through air, that is, the extended amount A of optical path length of the color light flux passing through the light-transmissive member, is expressed by the following equation (1):

$$A = (1 - 1/n)d \qquad (1)$$

where "d" represents the thickness of the light-transmissive member, and "n" represents the refractive index of the light-transmissive member.

Therefore, even when components of the projector are disposed in a densely packed arrangement and the distance between the optical path of a specific color light and any of the components cannot be maintained at a sufficiently large value, the invention allows the distance to the component can be maintained at a sufficiently large value by extending only the optical path length of the specific color light, whereby the size of the projector can be reduced.

In the projector according to the aspect of the invention, among the plurality of color light fluxes, the optical path of a first light flux, with which the first reflection-type polarizing plate is illuminated, is preferably so positioned that the optical path faces the rear side of a second reflection-type polarizing plate, which is not the first reflection-type polarizing plate corresponding to the first reflection-type polarizing plate among the plurality of reflection-type light modulation device.

In the projector according to the aspect of the invention, since the optical path of the first color light flux is so positioned that the optical path faces the rear side of the second reflection-type light modulation device, the distance between the optical path of the first color light flux and the second reflection-type light modulation device can be adjusted appropriately. In particular, when a heat sink is provided on the rear side of the second reflection-type light modulation device, a space for dissipating heat through the heat sink can be efficiently provided.

In the projector according to the aspect of the invention, the light-transmissive member is preferably so disposed that a light exiting-side end surface through which the transmitted color light flux exits is inclined to one of the light incident surfaces by a predetermined angle.

In the aspect of the invention, the light-transmissive member is so disposed that the light exiting-side end surface thereof is inclined to one of the light incident surfaces by a predetermined angle. As a result, the color light flux (stray light) reflected off the light incident surface of the color combining device and further reflected off the light-transmissive member can be directed in a direction outside the color combining device. It is therefore possible to prevent stray light from entering a projected image through the color combining device and the projection lens, whereby the quality of the projected image can be maintained at a satisfactory level.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.
Configuration of Projector FIG. 1 diagrammatically shows a schematic configuration of a projector 1.

The projector 1 modulates a light flux emitted from a light source in accordance with image information to form image light and projects the image light on a screen (not shown). The projector 1 includes an exterior housing 2 that forms the exterior of the projector 1, a projection lens 3 as a projection optical apparatus, and an optical unit 4, as shown in FIG. 1.

Figure 1:
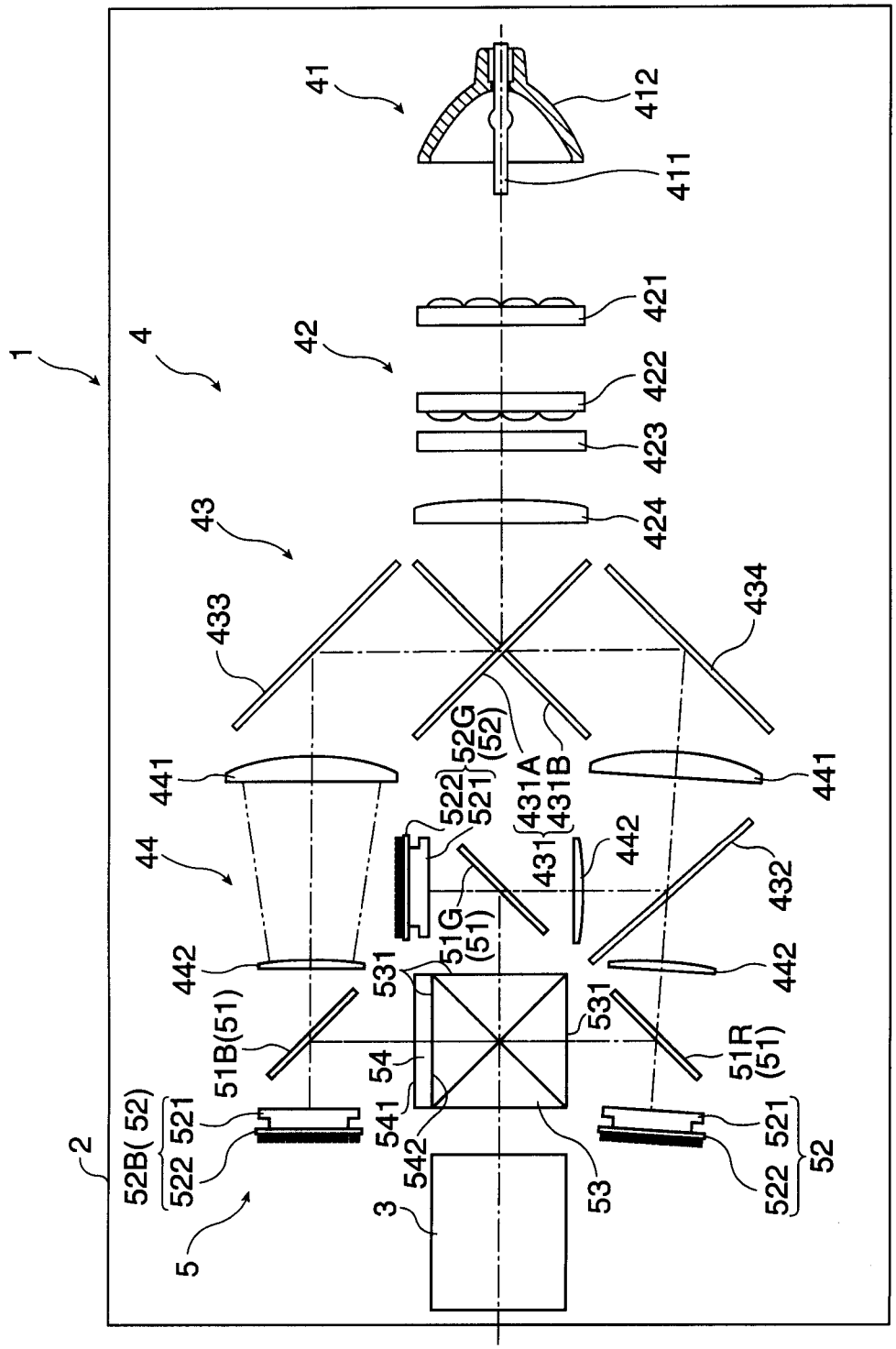
FIG. 1 diagrammatically shows a schematic configuration of a projector in a first embodiment.

In FIG. 1, although not specifically shown, the space in the exterior housing 2 other than the projection lens 3 and the optical unit 4 accommodates, for example, a cooling unit including a cooling fan that cools components in the projector 1, a power source unit that supplies electric power to the components in the projector 1, and a control unit that controls the components in the projector 1.

The optical unit 4 optically processes the light flux emitted from the light source to form image light corresponding to an image signal under the control of the control unit. The optical unit 4 includes a light source apparatus 41, an illumination optical apparatus 42, a color separation optical apparatus 43, light collection optical apparatus 44, and an optical apparatus 5, as shown in FIG. 1. The optical unit 4 further includes optical part housings (not shown) that accommodate the members 41 to 44 and 5.

The light source apparatus 41 includes a light source lamp 411 and a reflector 412.

The illumination optical apparatus 42 includes a first lens array 421, a second lens array 422, a polarization conversion element 423 that converts light incident thereon into substantially one type of linearly polarized light, and a superimposing lens 424.

The color separation optical apparatus 43 includes a cross dichroic mirror 431, a G-light reflecting dichroic mirror 432, and two reflection mirrors 433 and 434. The cross dichroic mirror 431 is formed of a B-light reflecting dichroic mirror 431A that reflects blue light and a GR-light reflecting dichroic mirror 431B that reflects green light and red light, and the B-light reflecting dichroic mirror 431A and the GR-light reflecting dichroic mirror 431B are disposed in an X shape. The G-light reflecting dichroic mirror 432 reflects green light.

The light collection optical apparatuses 44 are respectively disposed between the reflection mirror 433 and the optical apparatus 5 (wire grid 51B) and between the reflection mirror 434 and the optical apparatus 5 (wire grids 51R and 51G). Each of the light collection optical apparatuses 44 includes a light incident-side lens 441 and a light exiting-side lens 442.

A light flux having exited from the light source apparatus 41 and passed through the illumination optical apparatus 42 is incident on the cross dichroic mirror 431 and separated into blue, green, and red light components.

Blue light separated by the cross dichroic mirror 431 is reflected off the reflection mirror 433, passes through the corresponding light collection optical apparatus 44, and then enters a wire grid 51B, which is part of the optical apparatus 5 and described later.

Green light and red light separated by the cross dichroic mirror 431 are reflected off the reflection mirror 434, pass through the corresponding light collection optical apparatus 44, impinge on the G-light reflecting dichroic mirror 432, where they are separated into green and red light components. The green light then enters a wire grid 51G, which is part of the optical apparatus 5 and described later. On the other hand, the red light enters a wire grid 51R, which is part of the optical apparatus 5 and described later.
Configuration of Optical Apparatus The optical apparatus 5 includes three wire grids 51, each of which works as a reflection-type polarizing plate, three reflection-type light modulation device 52, a cross dichroic prism 53 as a color combining device, and a glass plate 54 as a light-transmissive member, as shown in FIG. 1.

In FIG. 1, reference character 51R denotes the wire grid for red light, reference character 51G denotes the wire grid for green light, and reference character 51B denotes the wire grid for blue light for ease of description, and the reflection-type light modulation device 52 follow the same notation.

The three wire grids 51 are provided in correspondence with the three reflection-type light modulation device 52 and separate incident light fluxes based on polarization in a diffraction process based on a grating structure. Each of the wire grids 51 is so disposed that it is inclined to the optical axis of the incident light flux by approximately 45 degrees, as shown in FIG. 1. Each of the wire grids 51 transmits polarized light (first linearly polarized light) having substantially the same polarization direction as that provided by the polarization conversion element 423 and reflects polarized light (second linearly polarized light) having a polarization direction perpendicular to the polarization direction described above. The incident light fluxes are thus separated based on polarization.

Each of the three reflection-type light modulation device 52 includes a reflective liquid crystal panel 521 and a heat sink 522, as shown in FIG. 1.

Each of the reflection-type light modulation device 52 is so disposed that the reflective liquid crystal panel 521 is substantially perpendicular to the optical axis of the light flux having passed through the corresponding wire grid 51 as shown in FIG. 1.

The reflective liquid crystal panel 521 is formed of what is called LCOS, in which liquid crystal molecules are placed on a silicon substrate, and held by a holding frame (not shown) made of a thermally conductive material.

The control unit controls the orientation of the liquid crystal molecules in the reflective liquid crystal panel 521, which modulates the polarization direction of the polarized light flux having passing through the wire grid 51 in accordance with image information and reflects the modulated polarized light flux toward the wire grid 51. In the light flux modulated and reflected toward the wire grid 51 by the reflective liquid crystal panel 521, only a polarized light component having a polarization direction perpendicular to the polarization direction provided by the polarization conversion element 423 is reflected off the wire grid 51 and directed toward the prism 53.

The heat sink 522 is attached to the rear side of the holding frame (the side facing away from the reflection surface of the reflective liquid crystal panel 521) and dissipates heat generated in the reflective liquid crystal panel 521.

The prism 53 has light incident surfaces 531 on which the color light fluxes reflected off the wire grids 51 are incident and combines the incident color light fluxes to form image light, as shown in FIG. 1. The prism 53 is formed by bonding four rectangular prisms and thus has a substantially square shape in a plan view, and two dielectric multilayer films are formed along the interfaces between the bonded rectangular prisms. The dielectric multilayer films transmit the green light reflected off the wire grid 51G and reflect the red light and the blue light respectively reflected off the wire grids 51R and 51B. The color light fluxes are thus combined to form image light. The image light formed by the prism 53 is then projected toward the screen through the projection lens 3.

In the projector 1, among the red, green, and blue light fluxes, part of the optical path of the blue light flux, which is a first color light flux, with which the wire grid 51B as a first reflection-type polarizing plate is illuminated, (optical path between the reflection mirror 433 and the wire grid 51B), is so positioned that the part of the optical path faces the rear side (the side where the heat sink 522 is present) of the second reflection-type light modulation device 52G, which is not the first reflection-type light modulation device 52B corresponding to the wire grid 51B, as shown in FIG. 1.

It is noted that the panel surface of the reflective liquid crystal panel 521 in each of the reflection-type light modulation device 52 is disposed in a position corresponding to the back focal point of the projection lens 3 so that sharp image light is projected through the projection lens 3.

The blue light modulated by the reflection-type light modulation device 52B passes through the glass plate 54, which will be described below.

The glass plate 54 is formed of a transparent plate made of white glass and having a uniform thickness and has a light incident surface 541 and a light exiting surface 542 configured to be parallel to each other. The light incident surface 541 is a light incident-side end surface of the glass plate 54 on which the blue light is incident, and the light exiting surface 542 is alight exiting-side end surface of the glass plate 54 through which the transmitted blue light exits. Specifically, the light incident surface 541 and the light exiting surface 542 are configured to have the same size as or to be smaller than that of the corresponding light incident surface 531 of the prism 53. The light exiting surface 542 of the glass plate 54 is glued to the light incident surface 531 of the prism 53 on which the blue light is incident. Specifically, the glass plate 54 is glued to the prism 53 with a transparent adhesive. Since the glass plate 54 is thus disposed between the wire grid 51B and the prism 53, the optical path length of the blue light that passes through the glass plate 54 is changed.

The relationship between the glass plate 54 and the optical path length will now be described in detail.

A light-transmissive member extends an optical path length by the amount A (difference in optical path between color light traveling through the light-transmissive member and the color light traveling through air) expressed by the following equation (2):

$$A = (1 - 1/n)d \quad (2)$$

where "d" represents the thickness of the light-transmissive member, and "n" represents the refractive index of the light-transmissive member.

For example, when the glass plate 54 is a white glass plate having a thickness "d" of 4 mm and a refractive index "n" of approximately 1.5, $A = (1 - 1/1.5) \times 4$ is approximately 1.33, which means that the optical path length of the blue light passing through the glass plate 54 is extended by approximately 1.33 mm. That is, the reflection-type light modulation device 52B is farther away from the back focal position of the projection lens 3 by approximately 1.33 mm than in a case where no glass plate 54 is disposed.

The equation (2) also shows that the extended amount of optical path length can be adjusted by changing the thickness of the glass plate 54 or the material thereof.

Figure 2:
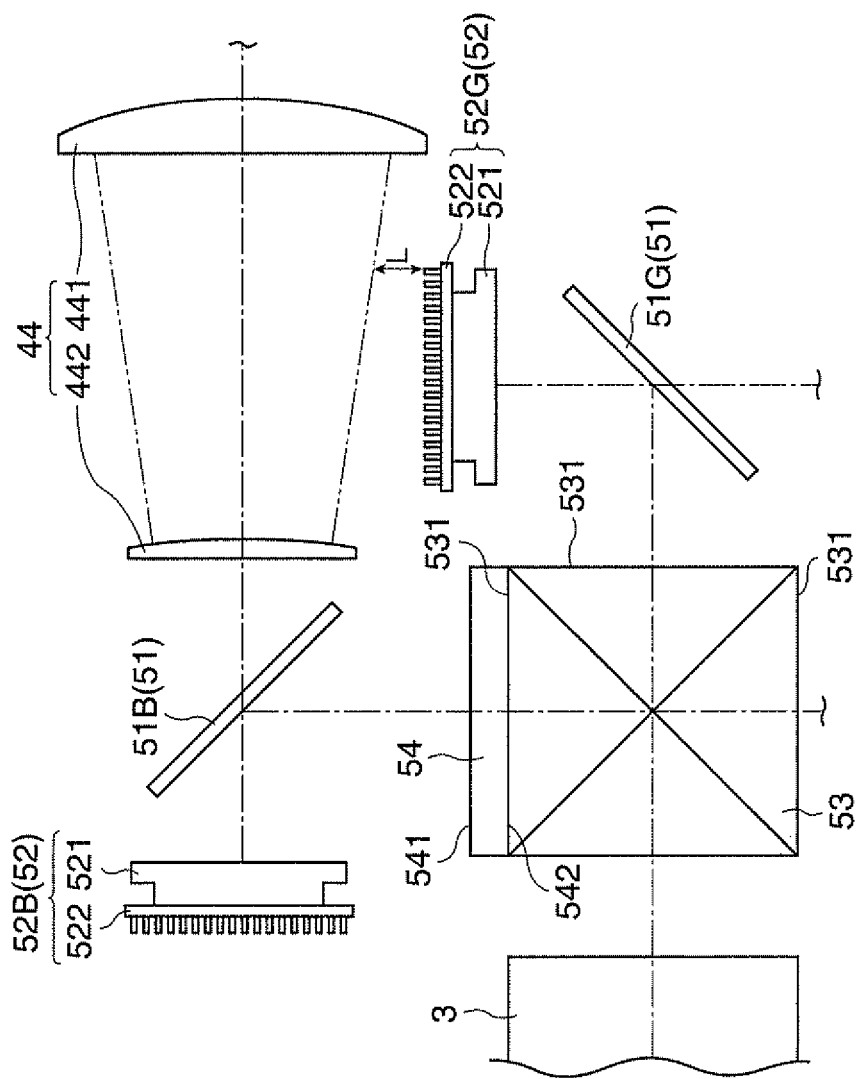
FIG. 2 describes how an optical path length is extended in the present embodiment.
Figure 3:
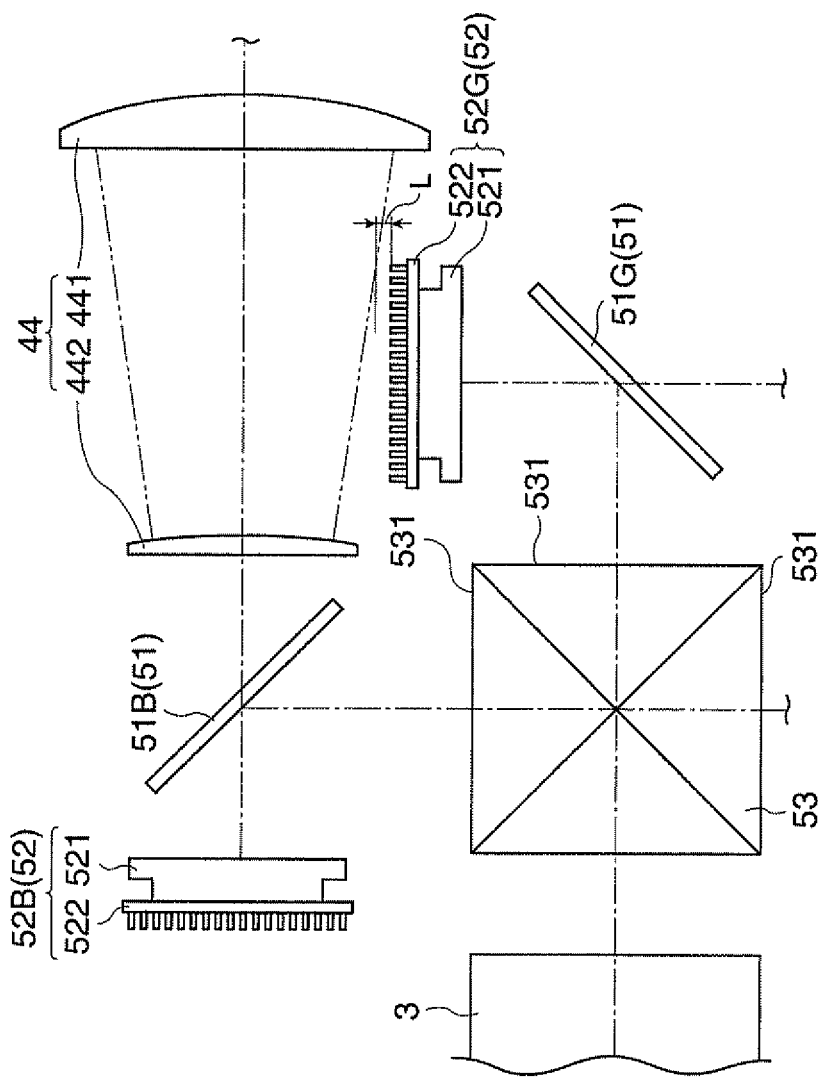
FIG. 3 also describes how an optical path length is extended in the present embodiment.

FIGS. 2 and 3 describe how the optical path length is extended. Specifically, FIG. 2 shows the configuration of the optical path in the present embodiment (when the glass plate 54 is provided), and FIG. 3 shows the configuration of the optical path without the glass plate 54.

As shown in FIG. 2, in the projector 1 with the glass plate 54, the optical path length of the blue light passing through the glass plate 54 is extended, whereby the distance L between the reflection-type light modulation device 52G and the optical path of the blue light can be a sufficiently large value. On the other hand, the optical path lengths of the red light and the green light remain unchanged.

As described above, even when the wire grids 51, the reflection-type light modulation device 52, and other components are disposed in a densely packed arrangement in the projector 1 so that the size of the optical apparatus 5 is reduced, but the distance between the optical path of the blue light and the reflection-type light modulation device 52G decreases, extending only the optical path length of the blue light by disposing the glass plate 54 only between the wire grid 51B and the prism 53 allows the distance between the optical path of the blue light and the reflection-type light modulation device 52G to be maintained at an appropriate value.

In contrast, when no glass plate 54 is provided, the distance L between the reflection-type light modulation device 52G and the optical path of the blue light cannot be maintained at a sufficiently large value, as shown in FIG. 3. When the distance L is insufficient, not only does the heat sink 522 in the reflection-type light modulation device 52G suffer reduced cooling efficiency, but also the heat sink 522 interferes with the optical path of the blue light. That is, the heat sink 522 disadvantageously interferes, for example, with the components of the light collection optical apparatus 44 in the optical path of the blue light and the optical part housing that accommodates the optical path of the blue light.

To maintain the distance between the optical path of the blue light and the reflection-type light modulation device 52G at an appropriate value and reduce the size of the optical apparatus 5 at the same time, only the optical path length of the blue light may be extended. On the other hand, all the reflection-type light modulation device 52 need to be disposed in the back focal position of the projection lens 3 so that sharp image light fluxes are projected through the projection lens 3. Simply extending the optical path length of the blue light therefore requires the optical path lengths of the other color light fluxes (red and green light fluxes) to be extended, resulting in no reduction in the size of the optical apparatus 5.

The present embodiment described above provides the following advantageous effects.

In the present embodiment, the projector 1 includes the glass plate 54 disposed only in the optical path of the blue light between the wire grid 51B and the prism 53 and transmitting the blue light incident via the wire grid 51B on the prism 53.

As a result, the optical path length of the blue light passing through the glass plate 54 becomes longer than in a case where no glass plate 54 is provided. Only the optical path length of the blue light can therefore be extended without any extension of the optical path lengths of the other color light fluxes, whereby the distance between the optical path of the blue light and the reflection-type light modulation device 52G can be maintained at a sufficiently large value, and the size of the projector 1 can be reduced at the same time.

Further, in the projector 1 with the glass plate 54, the back focal position in the projector 1 can be changed without any increase in the number of manufacturing steps only by changing the thickness of the glass plate 54 when only the back focal position needs to be changed in a design stage.

Moreover, in the projector 1, since the optical path of the blue light incident on the reflection-type light modulation device 52B is so positioned that the optical path of the blue light faces the rear side of the reflection-type light modulation device 52G, the distance between the optical path of the blue light and the reflection-type light modulation device 52G can be adjusted appropriately. Specifically, the optical path length of the blue light between the wire grid 51B and the prism 53 can be extended by a desired value by adjusting the thickness of the glass plate 54 appropriately. A space for dissipating heat through the heat sink 522 in the reflection-type light modulation device 52G can therefore be efficiently maintained, as compared with a case where no glass plate 54 is provided.

Second Embodiment

A second embodiment of the invention will next be described with reference to the drawings.

In the following description, structures similar to those in the first embodiment and the same members as those in the first embodiment have the same reference characters, and detailed description of these structures and members will be omitted or simplified. The present embodiment differs from the first embodiment in terms of the arrangement of the glass plate 54 and the other structures are similar to those in the first embodiment.

Figure 4:
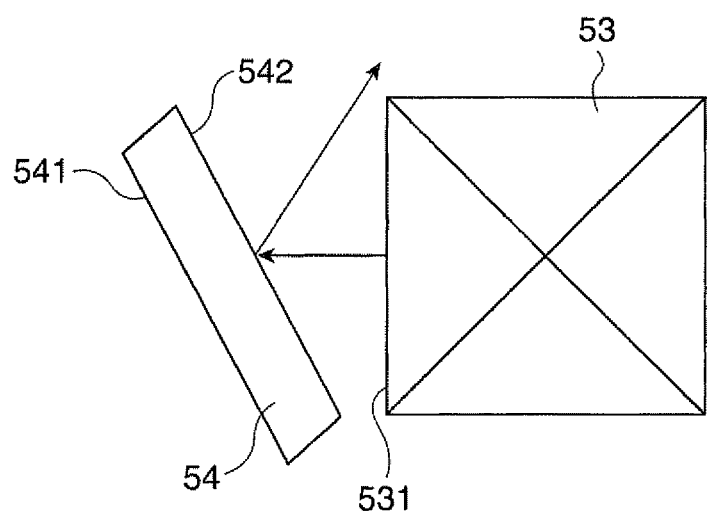
FIG. 4 describes a glass plate in a second embodiment.

FIG. 4 describes the glass plate 54 in the present embodiment.

As shown in FIG. 4, the glass plate 54 is so disposed in the present embodiment that there is a gap between the glass plate 54 and the prism 53.

Further, the glass plate 54 is so disposed that it is inclined to the light incident surface 531 of the prism 53 on which the blue light is incident. Specifically, the light exiting surface 542, which is the light exiting-side end surface of the glass plate 54, is inclined to the corresponding light incident surface 531 of the prism 53 by a predetermined angle.

The glass plate 54 is held by a holding member (not shown) so that the arrangement of the glass plate 54 is fixed.

The present embodiment described above provides the following advantageous effects in addition to those in the first embodiment.

In the present embodiment, the glass plate 54 is so disposed that the light exiting surface 542 thereof is inclined to the corresponding light incident surface 531 of the prism 53 by a predetermined angle. As a result, the color light flux (stray light) reflected off the light incident surface 531 of the prism 53 and further reflected off the glass plate 54 can be directed in a direction outside the prism 53. It is therefore possible to prevent stray light from entering a projected image through the prism 53 and the projection lens 3, whereby the quality of the projected image can be maintained at a satisfactory level.

Since the glass plate 54 is held by the holding member, it is not necessary to use an adhesive or any other means to glue the glass plate 54 to the prism 53.

The invention is not limited to the embodiments described above, and variations, improvements, and other modifications to the extent that the advantage of the invention is achieved fall within the scope of the invention.

In the first embodiment described above, the glass plate 54 is glued to the prism 53, but the invention is not necessarily implemented this way. The glass plate 54 may alternatively be glued to the wire grid 51B.

In each of the embodiments described above, the wire grids 51 are used as the reflection-type polarizing plate, but other suitable reflection-type polarizing plate having different configurations may be used.

For example, each of the reflection-type polarizing plate may, for example, be a polarization separation element formed of a dielectric multilayer film, a laminar, polymeric polarizer obtained by stacking organic materials having refractive index anisotropy (birefringence), such as a liquid crystal material, an optical element obtained by combining a circularly polarizing reflector, which separates incident unpolarized light into right-handed circularly polarized light and left-handed circularly polarized light, with a quarter-wave plate, an optical element that separates incident light into reflected polarized light and transmitted polarized light based on a Brewster angle, or a holographic optical element using a hologram.

In each of the embodiments described above, each of the wire grids 51 as the reflection-type polarizing plate transmits the first linearly polarized light to allow it to be incident on the corresponding reflective liquid crystal panel 521 and reflects the second linearly polarized light in a direction outside the optical path, but the invention is not necessarily implemented this way.

For example, in contrast to the above, each of the reflection-type polarizing plate may be configured to reflect the first linearly polarized light to allow it to be incident on the corresponding reflective liquid crystal panel 521 and transmit the second linearly polarized light in a direction outside the optical path.

In each of the embodiments described above, the glass plate 54 made of white glass has been illustrated and described as the light-transmissive member. The light-transmissive member is not limited thereto but may be made of sapphire, a resin material, or any other suitable material. The extended amount of optical path length can be adjusted based on the difference in refractive index by selecting the material as appropriate. Further, the light-transmissive member does not necessarily have a plate-like shape but may, for example, have a box-like shape.

In each of the embodiments described above, the glass plate 54 is disposed in the optical path of the blue light, but the invention is not necessarily implemented this way. The glass plate 54 may alternatively be disposed in the optical path of the red light or the green light. Specifically, the glass plate 54 is preferably disposed in an optical path having an independent configuration between the cross dichroic mirror 431 and the corresponding reflection-type light modulation device 52 (in the optical path of the blue light in each of the embodiments described above).

In each of the embodiments described above, the glass plate 54 is provided to ensure a sufficiently large distance L between the reflection-type light modulation device 52G and the optical path of the blue light, but the invention is not necessarily implemented this way. The glass plate 54 may alternatively be provided to ensure a sufficiently large distance between the optical path of the blue light and any other member that interferes therewith.

In each of the embodiments described above, the projector 1 is a three-panel projector including three reflection-type light modulation device 52, but the invention is not necessarily implemented this way. The projector 1 may alternatively be a projector including two reflection-type light modulation device 52 or a projector including four or more reflection-type light modulation device 52.

In each of the embodiments described above, only a front-projection projector in which an image is projected from the viewer's side, where a viewer observes the screen, is presented by way of example, but the invention is also applicable to a rear-projection projector in which an image is projected from the side facing away from the viewer's side, where the viewer observes the screen.

The invention can be used with a projector used in a presentation and a home theater.

The present application claim priority from Japanese Patent Application No. 2010-011765 filed on Jan. 22, 2010, which is hereby incorporated by reference in its entirety.

What is claimed is:

1. A projector comprising:
   a plurality of reflection-type light modulation devices which modulate a plurality of color light fluxes according to image information;
   a plurality of reflection-type polarizing plates provided in correspondence with the plurality of reflection-type light modulation devices and separating the plurality of color light fluxes that are illuminated to the plurality of reflection-type light modulation devices and modulated by the plurality of reflection-type light modulation devices according to polarization;
   a color combining device having a plurality of light incident surfaces on which the plurality of color light fluxes that have been modulated by the plurality of reflection-type light modulation devices and passed through the plurality of reflection-type polarizing plates are incident, the color combining device combining each of the incident color light fluxes of the plurality of color light fluxes;
   a projection lens that projects the combined plurality of color light fluxes from the color combining device; and
   a light-transmissive member that transmits a color light flux incident thereon,
   wherein
      the light-transmissive member is disposed only in an optical path between a first reflection-type polarizing plate, which is one of the plurality of reflection-type polarizing plates, and the color combining device, and among the plurality of color light fluxes, an optical path between a reflection mirror and the corresponding reflection-type light modulation device, with which the first reflection-type polarizing plate is illuminated, is positioned so that part of the optical path faces close to a rear side of a second reflection-type light modulation device, which is not the first reflection-type light modulation device corresponding to the first reflection-type polarizing plate among the plurality of reflection-type light modulation device,
      an optical path length of one of the plurality of light fluxes is longer than an optical path length of other of the plurality of color light fluxes,
      the light-transmissive member is disposed along an optical path between one of the reflection-type polarizing plate and the color combining device, but not along optical paths between others of the reflection-type polarizing plates and the color combing device,
      the optical path length between the one of the reflection-type polarizing plate and the color combining device is longer than the optical path length between the others of the reflection-type polarizing plates and the color combining device, and
      the plurality of reflection-type polarizing plates reflect the color light fluxes modulated by the corresponding plurality of reflection-type light modulation devices toward the color combining device after the plurality of reflection-type polarizing plates transmit the color light fluxes toward the plurality of reflection-type light modulation devices.

2. The projector according to claim 1, wherein the light-transmissive member is disposed such that a light exiting-side end surface through which the transmitted color light flux exits is inclined toward one of the light incident surfaces of the color combining device by a predetermined angle.

3. The projector according to claim 1, wherein the reflection mirror is disposed on the optical path of one of the plurality of light fluxes before the corresponding reflection type light modulation device.

4. The projector according to claim 1, wherein only one of the plurality of color light fluxes is reflected by the reflection mirror and passes through the corresponding reflection-type light modulation device.

5. The projector according to claim 1, wherein the light transmissive member is configured to transmit any of the plurality of color light fluxes incident thereon.

* * * * *